Nov. 11, 1958 — C. E. EVANS — 2,859,601
CONTROLLED TORQUE DEVICE
Filed Jan. 18, 1955 — 5 Sheets-Sheet 2
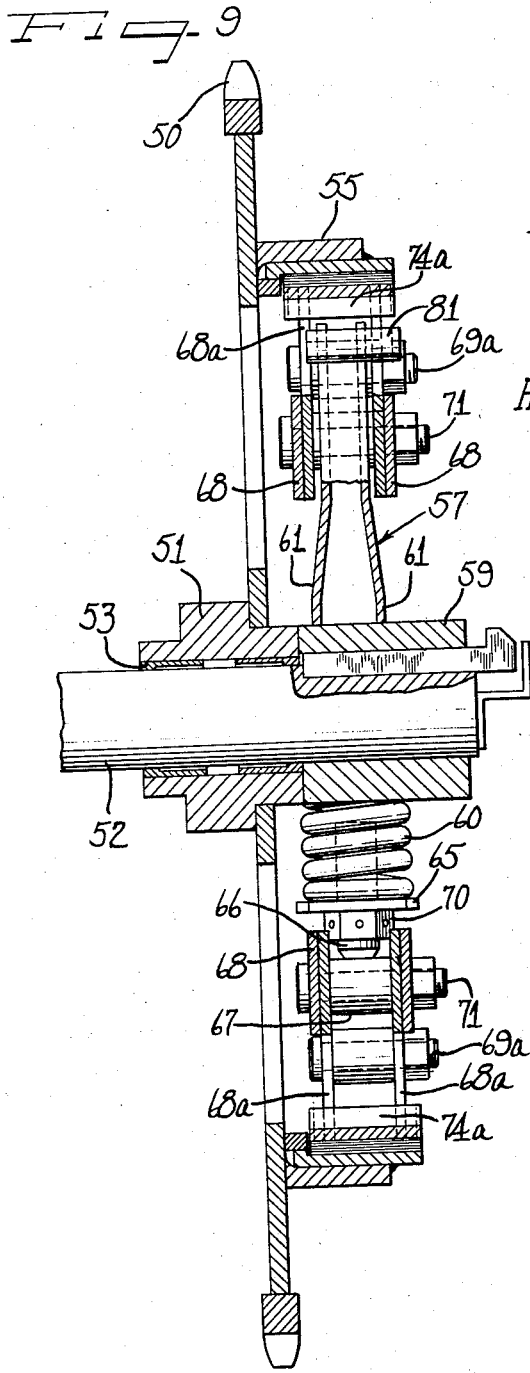
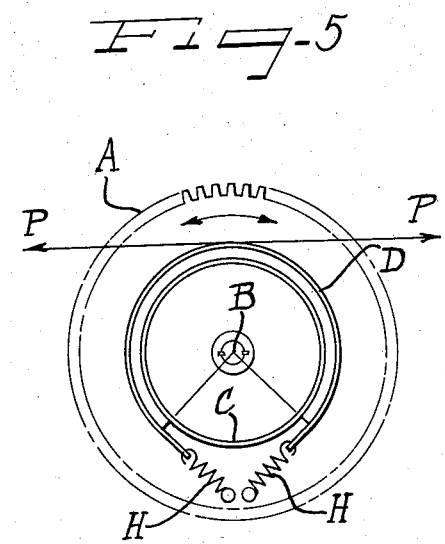
Inventor
Charles E. Evans

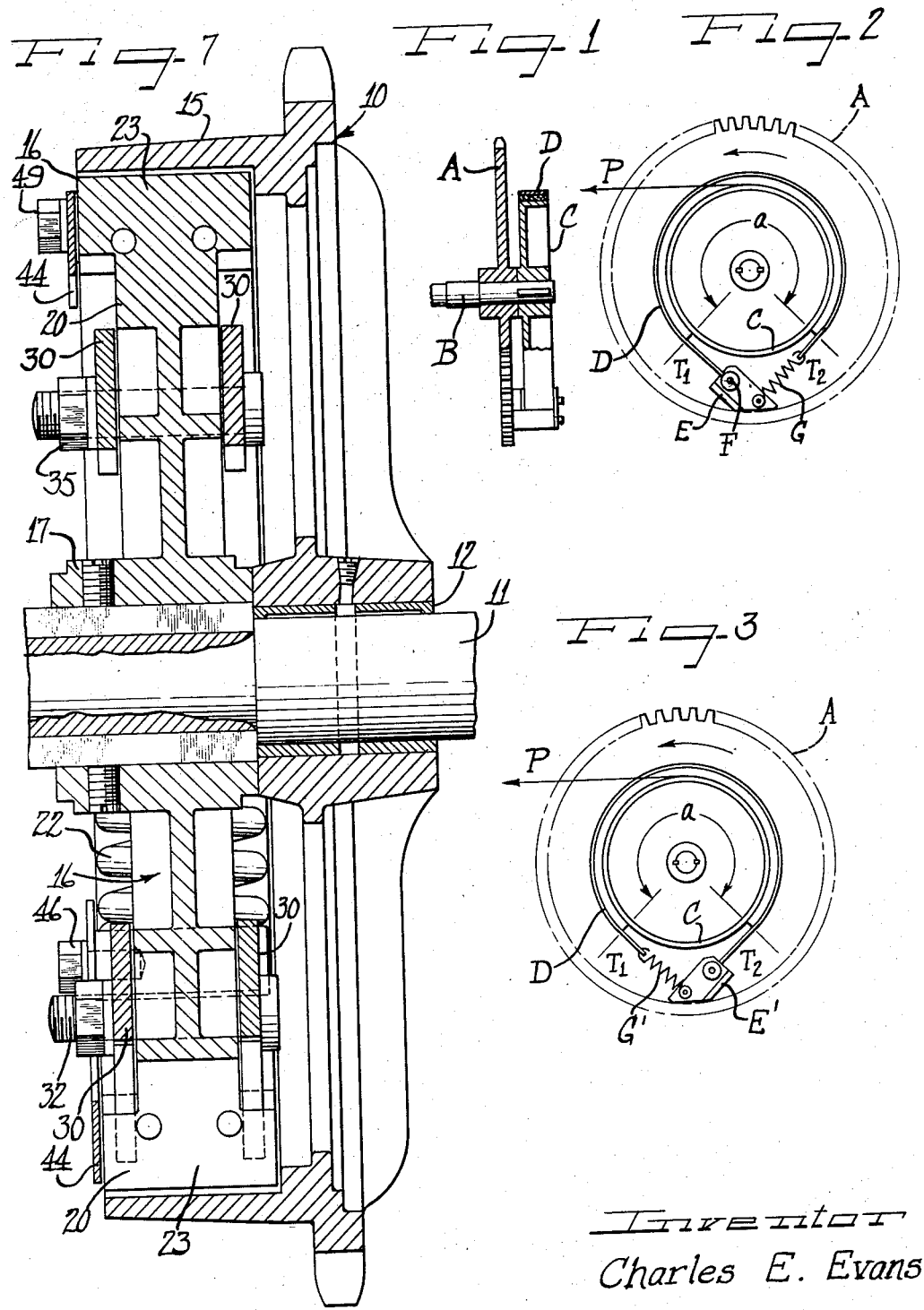

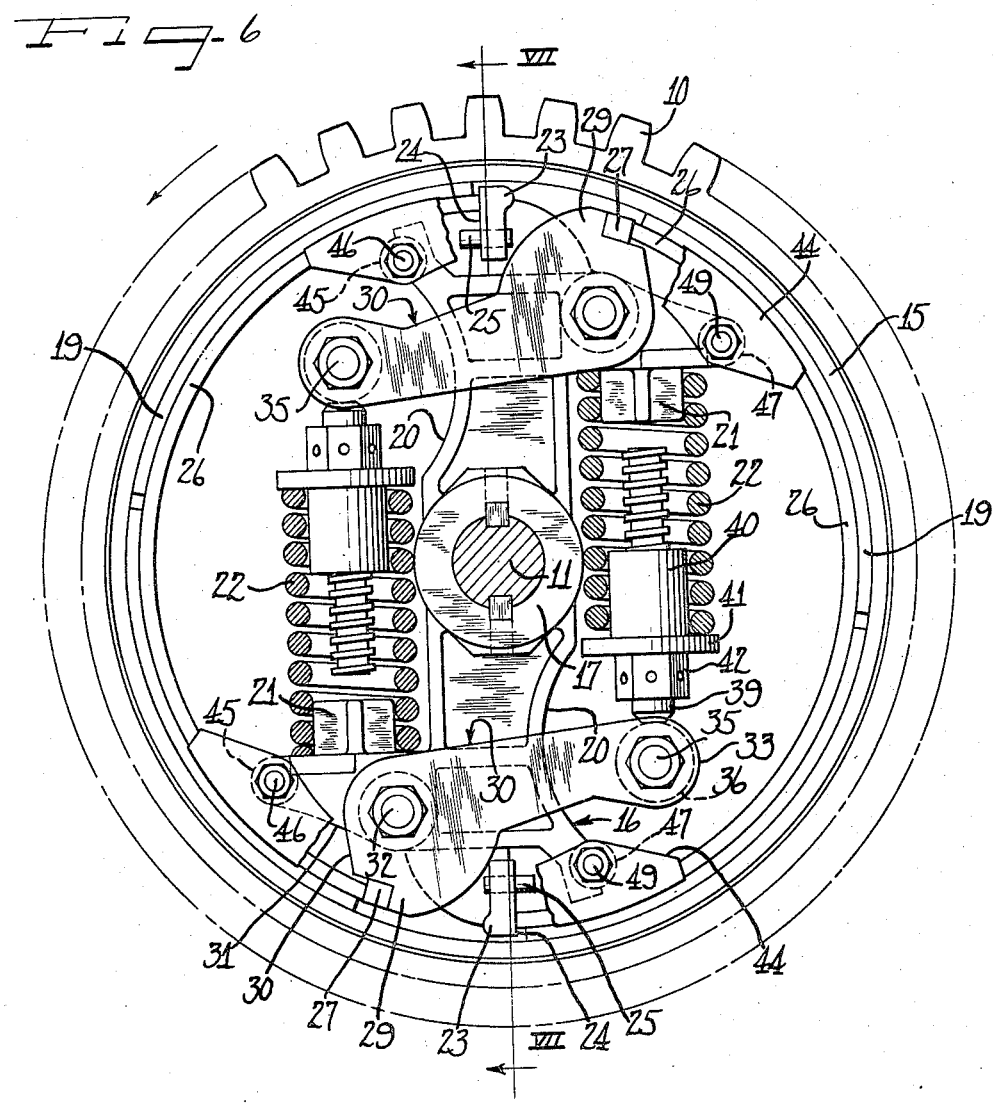

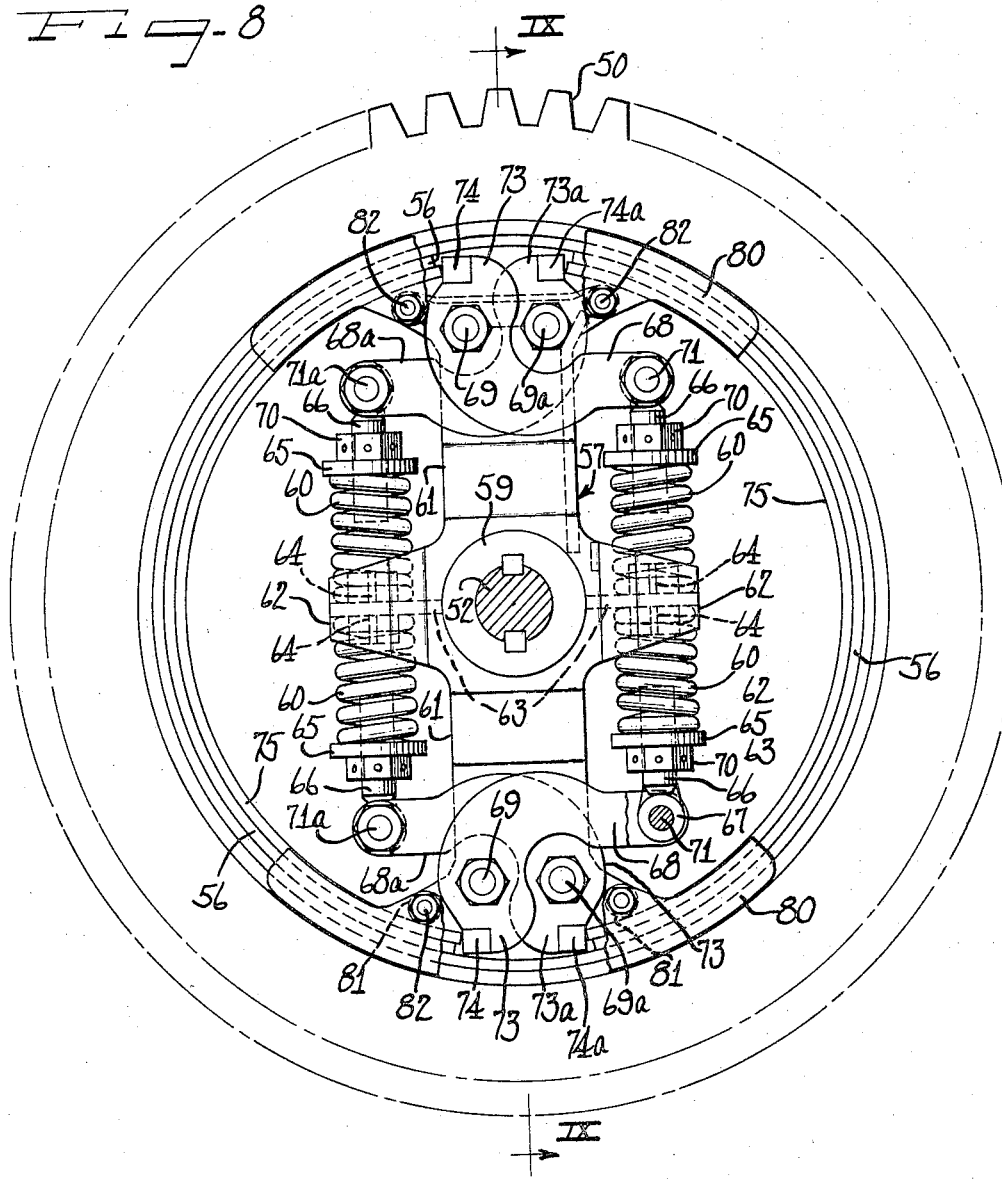

Nov. 11, 1958 C. E. EVANS 2,859,601
CONTROLLED TORQUE DEVICE
Filed Jan. 18, 1955 5 Sheets-Sheet 5

Inventor
Charles E. Evans

United States Patent Office
2,859,601
Patented Nov. 11, 1958

2,859,601

CONTROLLED TORQUE DEVICE

Charles E. Evans, Naperville Township, Du Page County, Ill., assignor to Barber-Greene Company, Aurora, Ill.

Application January 18, 1955, Serial No. 482,531

9 Claims. (Cl. 64—30)

This invention relates to improvements in controlled torque driving devices.

Heretofore controlled torque driving devices have been provided which have been incorporated in the drive to the bucket lines of ditching machines and other devices operating under heavy shock loads. In some cases, torque control has been obtained, by means of shear pins, spring loaded jaw clutches, or similar devices, which let go completely, at a predetermined load. These caused an objectionable recoil throughout the driving mechanism. Also, with spring loaded jaw clutches, or similar devices, that were self setting, there was more or less shock, when the load was again picked up. In other torque driving devices a friction band or shoe forms the driving member for driving a driven member from a sprocket or other rotatably driven member and a spring usually holds the friction band or shoe in engagement with the driving or driven member depending upon the arrangement and construction of the members. This spring has been associated with what is commonly termed the loose or slack end of a friction band or shoe, which is the opposite end of the friction band or shoe from the end thereof taking the direct torque load. With such torque clutches, the load at which the clutch slips varies to an undesirable extent due to varying friction conditions, caused by rain, dust, grease and the like coming in contact with the friction band or shoe, which considerably reduces the efficiency of the driving device and the effectiveness of the control.

A principal object of my present invention is to remedy the disadvantages in the prior art torque clutches or driving devices, by loading the tight end of a friction member by a spring to provide a definite measure of torque on the spring and maintain a measured torque on the driven member in spite of varying coefficients of friction.

A further object of my invention is to provide a deenergizing torque clutch in which the drive is through a preloaded spring giving a definite measure of torque at which the drive device will definitely slip, and allow the bucket line or other device, to come to a complete stop, although still under load.

Another and more specific object of my invention is to provide a reverse acting controlled torque driving device in which a friction band or shoe serves to drive a driven member from a driving member, and in which the drive is through either end of the friction band depending upon the direction of rotation of the device.

A still further object of my invention is to provide a deenergizing torque driving device in which the drive is through a floating friction band engaging a stop at one end and having connection with a preloaded spring at its opposite end, to effect a drive from the driving to the driven member directly through the spring.

Still another object of my invention is to provide a deenergizing torque driving device having a friction band interposed between two stops, one of which is fixed and the other of which is movable, and biasing the movable stop into engagement with the friction band by a preloaded spring to effect a measured torque drive through the spring.

Still another and important object of my invention is to provide a reverse acting torque driving device comprising a deenergizing clutch in which a friction band serves as the drive member between a driving and a driven member and is abutted at its opposite ends by movable stops biased into engagement with opposite ends of the friction band by preloaded springs, to effect a drive through an associated spring in either direction of rotation of the driving device.

These and other objects of my invention will appear from time to time as the following specification proceeds and with reference to the accompanying drawings wherein:

Figure 1 is a diagrammatic view diagrammatically illustrating in section a form of prior art torque controlled driving device;

Figure 2 is an end view of the torque controlled driving device shown in Figure 1;

Figure 3 is a diagrammatic view showing a torque controlled driving device constructed in accordance with the principles of my invention;

Figure 4 is a diagrammatic view showing a reverse acting torque controlled driving device constructed in accordance with my invention;

Figure 5 is a diagrammatic view showing still another form of reverse acting torque controlled driving device constructed in accordance with my invention in which the arc of contact of the friction band is longer than that shown in Figure 4;

Figure 6 is a side view of a torgue controlled driving device constructed in accordance with my invention with certain parts broken away and certain other parts shown in section, in order to show certain details of my invention;

Figure 7 is a sectional view taken substantially along line VII—VII of Figure 6;

Figure 8 is a side view of a reverse acting torque controlled driving device constructed in accordance with my invention with certain parts thereof broken away and certain other parts shown in section;

Figure 10:
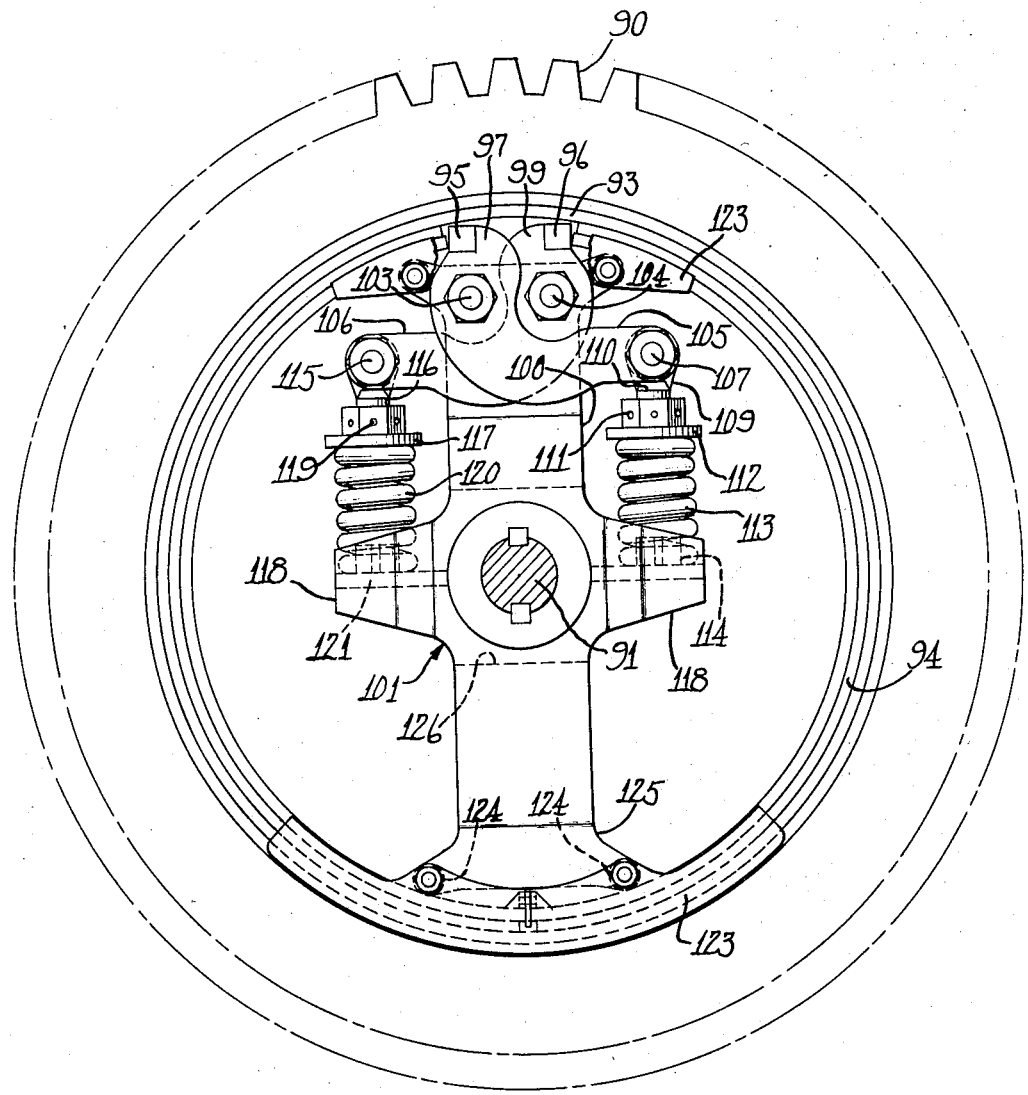

Figure 9 is a fragmentary sectional view taken substantially along line IX—IX of Figure 8 with certain parts broken away and certain other parts shown in section, in order to more clearly illustrate certain detailed features of my invention; and Figure 10 is a side view of still another form of reverse acting driving device constructed in accordance with my invention in which a single band having relatively large arc of contact is substituted for the two friction bands shown in Figure 8.

Referring now in particular to Figures 1, 2 and 3, of the drawings, diagrammatically illustrating the advantages of the torque controlled driving device of my present invention over a torque controlled driving device heretofore used for similar purposes, I have shown in Figures 1, 2 and 3 a sprocket A freely mounted on a shaft B. I have also shown a drum C keyed to the shaft B for rotatably driving the same. A friction band D engages the periphery of the drum C and in Figures 1 and 2 is anchored at its tight end to the sprocket A as by an anchoring device E and a pivot pin F. The end of the friction band D connected to the driving member or sprocket A and driven thereby and therefore taking the driving torque from the driving member to the driven member will hereinafter be referred to as the tight end of the friction band. The opposite end of the friction band which is also connected with the sprocket A will be referred to as the slack end of the friction band. In Figures 1 and 2 the slack end of the friction band D is anchored to the sprocket A and anchoring device E as by tension spring G.

In Figure 3 I have shown a friction drive which is like that shown in Figure 2 except that the slack end of the friction band D is anchored directly to the sprocket A through an anchoring device E' and the tight end of the friction band D is connected to the anchoring device E' and sprocket A through a spring G'. It will here be understood that the drive from the sprocket A to the drum C is through the spring G' connected to the anchoring device E' and the friction band D engaging the face of the drum C.

It shall here be understood that the showing of external bands in Figures 1, 2 and 3 is for illustrative purposes only and that the principles involved apply equally as well to internal as external bands.

In order to show the advantages of the form of torque controlled drive shown in Figure 3 over that shown in Figures 1 and 2, the difference in torque for varying friction conditions may be compared. This may be done by referring to Marks Mechanical Engineers Handbook, 4th edition, page 242, from which it may be seen that if T1 and T2 be the tensions with which a friction band is trained over a drum and the band slips from T2 toward T1 by reason of the difference in tension between T1 and T2, that $T1-T2$ will equal the circumferential force P transferred by friction, which will be equal to the frictional resistance W of the friction band on the drum.

Then disregarding the centrifugal force and letting "$a$" equal the angle subtending the arc of contact between the drum and friction band measured in radians:

$$T1 = T2 e^{fa}$$

in which "$f$" is the coefficient of friction between the band and drum.

$$P = \frac{(e^{fa}-1)}{e^{fa}} \quad T1 = (e^{fa}-1)T2$$

Now considering Table 4 on page 242, giving the values of $e^{fa}$ for various arcs of contact of the band D with the drum C for various coefficients of friction, and comparing the values of $e^{fa}$ for coefficients of friction of 0.25 and 0.35, where the angle "$a$" is equal to 252°, at a coefficient of friction of 0.25, $e^{fa}=3.00$ and at a coefficient of friction of 0.35, $e^{fa}=4.66$.

In the form of prior art shown in Figure 2, the tension T2 is held substantially constant by the spring G, and $P=(e^{fa}-1) \times T2$. Therefore the torque is proportional to the value $e^{fa}-1$. At a coefficient of friction of 0.25 the value of $e^{fa}-1$ will equal 2. Where the coefficient of friction is 0.35 the value of $e^{fa}-1$ will equal 3.66. The percent variation in torque in the prior art form of friction control device between a coefficient of friction 0.25 and 0.35 will therefore be 83%.

In the form of my invention shown in Figure 3 where the tight end of the band is connected to the sprocket A by the spring G', the tension T1 is held substantially constant by the spring G' and P equals $$\frac{e^{fa}-1}{e^{fa}} \times T1$$

The torque is, therefore, proportional to the value $e^{fa}-1$ divided by $e^{fa}$.

Where the angle "$a$" is equal to 252° and where the coefficient of friction is 0.25, the value of $$\frac{e^{fa}-1}{e^{fa}}$$

will equal .667, and where the coefficient of friction is .35 calculated in the same manner $$\frac{e^{fa}-1}{e^{fa}}$$

will equal .785. The percent variation in torque between these two coefficients of friction will therefore be 18%.

In comparing the percentages of variation in torque between the torque clutch shown in Figure 2 and that of my present invention, as shown in Figure 3, it may be seen that the percent variation in torque for various coefficients of friction is substantially less where the tight end of the friction band is connected to its driven member through a spring as when the friction band is directly connected to its driven member at its tight end, as in the prior art forms of friction torque controlled driving devices.

The device of my present invention will therefore be unaffected by varying torque conditions such as grease, water or mud on the drum and friction band, resulting in a much more efficient and predictable friction release drive in which the torque at which the drive will release can be accurately predicted for the various friction conditions that are encountered in such a drive.

In Figures 4 and 5 I have diagrammatically illustrated the principles of my invention as applied to reversely acting friction torque devices. Figure 5 is similar to the device shown in Figure 3, except that both ends of the friction band are connected to the sprocket A by springs H—H.

In this case the springs H—H are identical and are identically mounted. The sum of the tensions T1 and T2 will, therefore, be constant, because any loading which increases the load on one spring will decrease the load on the other spring an equal amount.

In the disclosure of Figure 4 companion bands D are normally provided, while in the disclosure of Figure 5 a single band is shown as being provided and having an arc of contact with the friction drum of substantially 252°, as in the form of my invention illustrated in Figure 3.

In these two forms of my invention if the sum of T1 plus T2 is constant, then P varies as $$\frac{e^{fa}-1}{e^{fa}+1}$$

This is because $$T1 = T2 e^{fa}$$

and $$\therefore T1 - T2 = T2(e^{fa}-1)$$

$$T1 + T2 = T2(e^{fa}+1)$$

$$\frac{T1-T2}{T1+T2} = \frac{(e^{fa}-1)T2}{(e^{fa}+1)T2}$$

$$T1 - T2 = (T1+T2)\frac{(e^{fa}-1)T2}{(e^{fa}+1)T2} = P$$

Comparing the percent variation in torque of the form of my invention shown in Figure 6 where the friction band is in contact with the drum through an angle of 252° between a coefficient of friction of 0.25 and a coefficient of friction of 0.35, and taking the values of $e^{fa}$ from Table 4 of Marks Mechanical Engineers Handbook previously mentioned $$\frac{e^{fa}-1}{e^{fa}+1}$$

for a coefficient of friction 0.25 will equal .5.

$$\frac{e^{fa}-1}{e^{fa}+1}$$

for a coefficient of friction of 0.35 will equal .646.

The percent variation in torque will therefore be 29%, which while higher than the percent variation in torque of the form of my invention shown in Figure 3, is substantially lower than in the prior art form of torque control device shown in Figure 2.

It may be seen from the foregoing that by connecting the friction band to the drive member therefor through a spring and by driving through the spring that there is a definite measure of torque on the spring and that the variation in torque at which the clutch releases for varying coefficients of friction is substantially reduced from the prior art types of torque control devices, in which the tight end of the band is directly connected to the drive member therefor. The torque controlled driving device of my invention is, therefore, so arranged as to slip with a relatively constant measured torque for various friction conditions but maintains torque on the driven member at all times.

Referring now to Figures 6 and 7 illustrating one form in which the embodiment of my invention illustrated in Figure 3 may be carried out, a sprocket 10 is rotatably mounted on a shaft 11 on a bearing 12. The sprocket 19 has an annular flange or drum 15 extending therefrom over a driven member such as a spider 16 having a hub 17 keyed or otherwise secured to the shaft 11. The spider 16 floatingly carries two oppositely disposed friction bands 19—19 engageable with the inner periphery of the annular flange 17 for rotatably driving the spider 16 and shaft 11 from the drive sprocket 10.

The spider 16 is shown as having two arms 20 extending from the hub 17 in diametrically opposite directions and of a similar construction except that the one arm faces in one direction and the other arm faces in an opposite direction. The arm 20 has a spring seat 21 spaced to one side of a diametrical line extending through the center of the shaft 11 and extending within and forming a seat for a spring 22.

The arm 20 also has a lug 23 extending therefrom toward the inner margin of the drum 15, in a generally radial direction, and having a hardened renewable face plate 24 secured thereto as by pins 25. The face plate 24 is engageable with one end of a metal band 26 for the friction band 19 and forms a stop for one end of said friction band. The friction band 19 may be riveted or otherwise secured to the band 26. The end of the friction band 19 engaging the face plate 24 is referred to as the slack end of the friction band.

The opposite end of the band 26 is shown as abutting a movable stop or insert 27 on an arm 29 of a lever 30. The end of the friction band 19 acting against the movable stop 27 is the tight end of the friction band. The lever 30 is shown as being pivotally mounted inwardly of the stop 27 on an arm 31, projecting from the opposite arm 20 of the spider 16 from the first mentioned spring seat 21. The arm 20 has the spring seat 21 carried thereby on the opposite side thereof from the pivot for the lever 30. A pivot pin 32 forms a pivotal support for the lever arm 29 on the arm 31, and mounts the lever 30 for movement about an axis parallel to the axis of rotation of the shaft 11 and spaced radially outwardly from the axis of rotation of said shaft.

As shown in Figure 7, a lever 30 extends along each side of the arm 20 of the spider 16, and the two arms are pivotally mounted on said arm on the pivot pin 32. The levers 30 also have lever arms 33 extending along each side of the arm 20 of the spider 16 to the opposite side of said arm from the pivot pin 32. The lever arms 33 are connected together by a nut and bolt 35 having a sleeve 36 mounted thereon between the arms 33 and forming a seat for a spring 22, in axial alignment with the seat 21.

As herein shown, an adjusting screw 39 is welded or otherwise secured to the sleeve 36 and extends therefrom at right angles to said sleeve, and has a flanged sleeve 40 slidably carried thereon, the sleeve of which extends within the spring 22, and a flange 41 of which forms a seat for said spring. The flange 41 is abutted by an adjusting nut 42 threaded on the adjusting screw 39, for varying the tension of the spring 22 as required.

Retainer plates 44 are shown as being secured to the outer end portions of the arms 20 and extending along the outside of the friction bands 19, 19 for a portion of the length thereof. As herein shown each retainer plate 44 is secured to a projecting end portion 45 of the arm 31 as by a stud and nut 46. The opposite end portion of the retainer plate 44 is shown as being secured to a lug 47 projecting from the arm 20 in an opposite direction from the projection 45 and spaced closely adjacent the inner periphery of the metal band 26. A stud and nut 49 is provided to secure said plate to the lug 47.

The opposite friction band 19 is floatingly carried on the arm 20 in the same manner as the companion band 19, just described, and is interposed between a fixed stop 19 and a movable stop 27, and exerts a driving force against a spring 22 at its tight end and abuts the face plate or stop 24 at its opposite or slack end in the same manner as the companion band just described. A detailed description thereof, therefore, need not herein be repeated.

In operation of the clutch, assuming the clutch is rotating in a counter clockwise direction, as indicated by the arrow in Figure 6, each friction band 19 is interposed between a fixed stop 24 and a movable stop 27 pressed into engagement with the band by the associated spring 22. During normal operation of the driving device, a drive will be effected from the sprocket 10 through the tight ends of the friction bands 19, the movable stops 27 and the springs 22. Under normal torque conditions, a positive drive will be effected through the tight ends of the two bands 19 and the two springs 22.

When, however, predetermined overload conditions are encountered which are greater than the torque loadings of the springs 22, the stops 27 will yield in the direction of rotation of the sprocket 10, compressing the springs 22 and allowing movement of the bands and sprocket 10 relative to the spider 16. When this occurs, the friction bands 19 being floatingly carried between the stationary stops 24 and the movable stops 27, the slack ends of the friction bands will tend to move away from the stationary stops 24 and will thus reduce the pressure of the stationary stops on the slack ends of the bands, thereby allowing the sprocket to slip with respect to the bands.

The drive to the spider 20 and the shaft 11 is therefore, always from the tight ends of the friction bands 19 through the springs 22 and the torque on the drive shaft is measured by the loading of said springs.

Moreover, since the torque on the drive shaft 11 is produced through the springs 22 by the frictional engaging connection between the friction bands 19 and the sprocket 10, as well as the abutting connection between the driving or tight ends of said friction bands and the levers 29, the friction bands will slip with a constant torque, the measure of which is determined by the loading of the springs 22, and there will continually be a driving connection from the driving member 10 to the shaft 11.

Referring now to the reverse acting torque controlled device illustrated in Figures 8 and 9, and operating on the principles diagrammatically illustrated in Figure 4, a sprocket 50 is shown as extending from a hub 51, freely mounted on a shaft 52 on a bearing 53. The sprocket 50 is shown as having an annular flange 55 extending from one side thereof, the inner periphery of which is adapted to be engaged by diametrically opposed friction bands 56, as in the form of my invention shown in Figures 7 and 8.

The friction bands 56 serve to rotatably drive a spider 57 extending from a hub 59 keyed or otherwise secured to the shaft 52, through oppositely acting compression springs 60, 60 acting against each end of each friction band 56 and accommodating reverse rotation of the shaft 52 and providing a controlled torque in each direction of rotation thereof, as will now be described.

The spider 57 is shown as having laterally spaced arms 61, 61 extending generally radially from the hub 59 to positions adjacent the inner margins of the friction bands 56. The arms 61, 61 also have laterally projecting portions 62 extending in diametrically opposite directions from the hub 51 at right angles to the arms 61 and connected together by plates 63, shown as extending along a diametral line intersecting the axis of rotation of the shaft 52. The plates 63 form seats for the compression springs 60 and have aligned lugs 64 extending from opposite sides thereof within the inner ends of oppositely facing springs 60.

The end of each spring 60 opposite from its seat 64 is seated on a flange 65, slidably mounted on an adjusting screw 66. The adjusting screw 66 is herein shown as being welded or otherwise secured to a transverse sleeve 67 carried between spaced lever arms 68 on a bolt 71. A nut 70 threaded on the adjusting screw 66 abuts the flange 65 and serves to take up tension on the associated spring 60. The lever arms 68 are shown as extending inwardly from the adjusting screw 66 along the outer sides of the arms 61 of the spider 57, and as being pivotally connected to an arm 61 of said spider on a pivot pin or bolt and nut 69. As shown in Figure 9, the arms 68 lap similar arms 68a pivoted to the arms 61 of the spider 57 on the opposite side of the axis therefor from the arms 68 on pivot pins 69a.

The arms 68 have arms 73 extending radially outwardly from the pivot pin 69, having stops 74 thereon abutting an end of a metal band 75 backing a friction band 56, and having said friction band riveted or otherwise secured thereto.

The lever arms 68a have arms 73a extending radially outwardly from the pivot pins 69a and having stops 74a thereon abutting the opposite end of each metal band 75 from the stops 74.

The friction bands 56 are retained within the annular flange 55 by guard plates 80 extending along the adjacent end portions of the friction bands 56, and secured to spaced lugs 81 extending laterally from the arms 61 on opposite sides of the center thereof. Studs and nuts or like connecting devices 82 are provided to secure said guard plates to said lugs.

It may be seen from the foregoing that upon rotation of the sprocket 50 in either direction, that the drive to the spider 57 and shaft 52 from each friction band 56 will be through a spring 60 and that when the torque is greater than the measure of torque for which the springs 60 are loaded, that said springs will yield and accommodate movement of the band with respect to the spider 57, and thus reduce the pressure on the trailing end of the band 56 thereby allowing the sprocket to slip with respect to the bands in the same manner as occurs in the form of my invention shown in Figures 6 and 7.

In Figure 10 I have shown still another form in which my invention may be embodied in which a single friction band 94 takes the place of the companion bands 56 shown in Figure 8, and which operates on the principles diagrammatically illustrated in Figure 5.

In this form of my invention I have shown a drive sprocket 90, like the sprocket 50, and journaled for free rotation on a shaft 91 in the same manner the sprocket 50 is rotatably journaled on the shaft 52. The drive sprocket 90 has an annular flange 93 projecting outwardly from one face thereof, the inner periphery of which is engaged by a friction band 94 abutting movable stops 95 and 96 at its opposite ends. The movable stops 95 and 96 are carried on the ends of the spaced lever arms 97 and 99 respectively, extending along opposite sides of an arm 100 of a spider 101. The arms 97 are herein shown as overlapping the arms 99 and being pivotally connected to the arm 100 of the spider 101, on one side of the axis thereof on a nut and bolt 103 forming a pivot therefor. The lever arms 99 are similar to the lever arms 97 and extend laterally across each side of the arm 100 and are pivotally connected thereto on the opposite side of the axis thereof from the lever arms 97, on a nut and bolt 104. The lever arms 97 and 99 have inwardly and laterally extending lever arms 105 and 106, respectively, extending therefrom and formed integrally therewith. The arms 105 are shown as being connected together by a nut and bolt 107 having a spring seat or collar 109 rotatably mounted thereon and having an adjustment screw 110 extending therefrom at right angles to the axis of the collar 109 and welded or otherwise secured to said collar. The adjustment screw 110 is shown as having a nut 111 threaded thereon and abutting the flange of a flanged spring seat 112. A spring 113 is seated at one end on the spring seat 112 and at its opposite end on a seat 114 formed between the arms 118 of the spider 101 and extending diametrically of the axis of rotation of said spider at right angles to the arms 100.

In a like manner the arms 106 are connected together by a bolt 115 having an adjusting screw 116 pivotally mounted thereon and extending therefrom at right angles to the axis of the bolt 115. The adjusting screw 116 has a spring seat 117 slidably carried thereby and abutted by a nut 119 threaded on said adjusting screw. The seat 117 forms a seat for one end of a spring 120 exactly like the spring 113, the opposite end of which spring is seated in a seat 121 carried between the arms of the spider 101 and extending at right angles to the arm 100.

The friction band 94 is floatingly retained within the annular flange 93 by guard or retainer plates 123 at opposite ends of the spider 101. One retainer plate 123 is secured to lugs 124 spaced laterally from opposite sides of the outer end portion of an arm 125 of the spider 101, extending in a diametrically opposite direction from the arm 100. The other retainer plate is secured to similar lugs extending laterally from the arm 100.

In order to compensate for the difference in weight on opposite ends of the spider 101, the arm 125 is counterweighted as indicated by reference character 126.

It is clear from the foregoing that upon rotation of the sprocket 90 in either direction the drive will be through a preloaded spring 113 or 120, depending upon the direction of rotation of said sprocket, and that a reversely acting friction drive torque control device has been provided utilizing a single friction band and driving the spider 101 and shaft 91 through a constant value spring.

It should be understood that while I have shown friction bands serving as the friction drive members from a driving member to a driven member, that friction shoes may be substituted in place of the friction bands and that the friction bands or shoes may be either internal or external bands or shoes.

It will be understood that modifications and variations in the present invention may be effected without departing from the spirit and scope of the novel concepts thereof as defined by the claims appended hereto.

I claim as my invention:

1. In a controlled torque driving device, a driving member and a driven member, a friction drive connection between said driving member and said driven member, and transmitting a torque driving load from the driving member to the driven member comprising a friction member engageable with said driven member and having a tight end taking the driving torque from said driving member to said driven member and an opposite slack end, a spring loading the tight end of said friction member, the torque driving load being taken directly from the tight end of said friction member through said spring whereby said spring determines the measure of torque transmitted to said driven member, said spring initially yielding and accommodating the driving member and friction member to run ahead of the driven member, and as the transmitted torque increases, said spring progressively increasing the pressure on the tight end of the friction member with a resultant decrease in pressure on the slack end of the friction member until a predetermined torque is transmitted and the pressure on the slack end of the friction member is reduced to the extent to allow the friction member to slip.

2. In a controlled torque driving device, a driving member and a driven member, a friction member transmitting a torque driving load from said driving member to said driven member, said friction member having a tight end taking the driving torque from said driving member to said driven member and having an opposite slack end, a stop on one of said members engageable with the slack end of said friction member, a movable stop on said last mentioned member and engageable with the tight end of said friction member, and a preloaded spring biasing said movable stop into abutting engagement with the tight end of said friction member and loading the tight end of said friction member and transmitting the driving force from said friction member to said driven member, said spring accommodating the driving member and friction member to run ahead of the driven member under certain torque conditions, and as the transmitted torque increases progressively increasing the pressure on the tight end of the friction member and decreasing the pressure on the slack end of the friction member until the pressure on the slack end of the friction member becomes low enough to accommodate the friction member to slip at a predetermined torque load.

3. In a controlled torque driving device, a shaft, a driving member mounted on said shaft for free rotation with respect thereto, and a measured torque drive from said driving member to said shaft, comprising a driven member, a friction member having engagement with said driven member and having a tight end taking the driving torque from said driving member to said driven member and having an opposite slack end, a stop on said driven member adapted to abut the slack end of said friction member, and a preloaded spring connecting the tight end of said friction member with said driven member and loading the tight end of said friction member to effect a drive to said driven member through said friction member and spring, whereby said spring accommodates said driving member and friction member to run ahead of said driven member under certain torque conditions, and as the transmitted torque increases, progressively increases the pressure on the tight end of the friction member and decreases the pressure on the slack end of said friction member, until a predetermined torque is being transmitted, at which time the pressure on the slack end of said friction member becomes low enough to allow said friction member to slip.

4. In a controlled torque driving device, a shaft, a driving member mounted on said shaft for free rotation with respect thereto, a driven member secured to said shaft for rotating the same, one of said members having a drum thereon and the other of said members having a friction band floatingly mounted thereon for engagement with said drum, said shoe having a tight end taking the driving torque from said driving member to said driven member and having an opposite slack end, and a drive connection from said friction band to the associated member carrying said friction band, comprising a preloaded spring loading the tight end of said friction band and affording a drive from said friction band to said driven member, whereby said preloaded spring yields under load, accommodating said driving member and friction band to run ahead of said driven member, and as the transmitted torque increases progressively increasing the pressure on the tight end of said friction band and decreasing the pressure on the slack end of said friction band until a predetermined torque is transmitted, at which time the pressure on the slack end of said friction band becomes low enough to allow said friction band to slip.

5. In a controlled torque driving device, a shaft, a driving member mounted on said shaft for free rotation with respect thereto, a driven member secured to said shaft for rotatably driving the same, a friction member having a slack end and an opposite tight end, one of said members having a drum thereon, and the other of said members floatingly carrying said friction member for engagement with said drum, a stop on the member floatingly carrying said friction member adapted to abut a slack end of said friction member, and a preloaded spring loading an opposite tight end of said friction member and transmitting the driving force from said driving member to said driven member and yielding under said force and thereby accommodating said driving member and friction member to run ahead of said driven member, and as the transmitted torque increases, to progressively and simultaneously increase the pressure on the tight end of said friction member and decrease the pressure on the slack end thereof, until a predetermined torque is transmitted through said friction member, at which time the pressure upon the slack end of said friction member becomes small enough to allow said friction member to slip.

6. In a controlled torque driving device, a shaft, a driving member mounted on said shaft for free rotation with respect thereto and having an annular flange extending therefrom, a driven member secured to said shaft, a friction member engageable with said flange and floatingly carried by said driven member, said friction member having a tight end and an opposite slack end, a stop on said driven member adapted to abut the slack end of said friction member, a movable stop on said driven member abutting the tight end of said friction member, and preloaded spring means seated on said driven member and biasing said movable stop into abutting engagement with the tight end of said friction member and normally holding said friction member into abutting engagement with said stationary stop, and transmitting the driving torque from said friction member to said driven member and yielding under said torque and thereby allowing the driving member together with the friction member to run ahead of the driven member, and as the transmitted torque increases, to progressively and simultaneously increase the pressure on the tight end of said friction member and decrease the pressure on the slack end of said friction member, until when a predetermined torque is transmitted, the pressure on the slack end of said friction member becomes low enough to accommodate said friction member to slip.

7. In a controlled torque driving device, a shaft, a driving member mounted on said shaft for free rotation with respect thereto and having an annular flange extending therefrom, a driven member secured to said shaft, a friction member engageable with said flange and floatingly carried by said driven member and having a slack end and an opposite tight end, a stop on said driven member adapted to abut the slack end of said friction member, a lever pivoted on said driven member and having one arm engageable with the tight end of said friction member and forming a movable stop therefor, said lever having a second arm extending to the opposite side of the pivot of said lever from said one arm, and a preloaded spring seated on said driven member and having operative connection with said second arm of said lever for biasing said lever into engagement with the tight end of said friction member and determining the measure of driving torque from said friction member to said driven member and yielding under said torque and thereby accommodating said driving member and friction member to run ahead of said driven member, and as the transmitted torque increases, to progressively increase the pressure on the tight end of said friction member and decrease the pressure on the slack end of said friction member until when a predetermined torque is transmitted, the pressure on the slack end of said friction member becomes small enough to allow said friction member to slip.

8. A controlled torque driving device in accordance with claim 1 in which two springs are provided, each spring loading an end of the friction member, depending upon the direction of rotation thereof, whereby the tight end of the friction member is loaded in each direction of rotation thereof.

9. A controlled torque driving device in accordance with claim 2 in which the stops at opposite ends of the friction member are each movable and in which preloaded springs bias the stops into abutting engagement with opposite ends of the friction member, whereby the driving device is operable and the tight end of the friction member is loaded in each direction of rotation thereof.

References Cited in the file of this patent

UNITED STATES PATENTS

| | | |
|---|---|---|
| 971,335 | Williamson | Sept. 27, 1910 |
| 1,955,380 | Eddison | Apr. 17, 1934 |
| 2,050,613 | Kellogg | Aug. 11, 1936 |
| 2,409,192 | Collins | Oct. 15, 1946 |